United States Patent [19]

Maxwell

[11] 3,932,728
[45] Jan. 13, 1976

[54] ELECTRIC ARC FUSION WELDING APPARATUS

[75] Inventor: Ian Stuart Maxwell, Kitimat, Canada

[73] Assignee: Babcock & Wilcox, Limited, London, England

[22] Filed: Sept. 5, 1974

[21] Appl. No.: 503,404

[52] U.S. Cl. .............................. 219/131 R; 219/135
[51] Int. Cl.² ............................................. B23K 9/10
[58] Field of Search ......... 219/131 WR, 131 R, 135

[56] References Cited
UNITED STATES PATENTS

| | | | |
|---|---|---|---|
| 2,889,480 | 6/1959 | Soulary et al. | 219/131 R |
| 3,284,609 | 11/1966 | Allen et al. | 219/135 |
| 3,637,974 | 1/1972 | Tajbl et al. | 219/135 |
| 3,838,244 | 9/1974 | Petrides et al. | 219/131 R |

FOREIGN PATENTS OR APPLICATIONS

| | | | |
|---|---|---|---|
| 235,049 | 6/1925 | United Kingdom | 219/131 R |
| 29,891 | 11/1925 | France | 219/131 R |

*Primary Examiner*—J. V. Truhe
*Assistant Examiner*—Clifford C. Shaw
*Attorney, Agent, or Firm*—J. Maguire; R. J. Edwards

[57] ABSTRACT

A TIG welding arrangement utilizing a high frequency arc starting arrangement with a fuse protected secondary arc gap operable to protect the welding apparatus.

8 Claims, 1 Drawing Figure

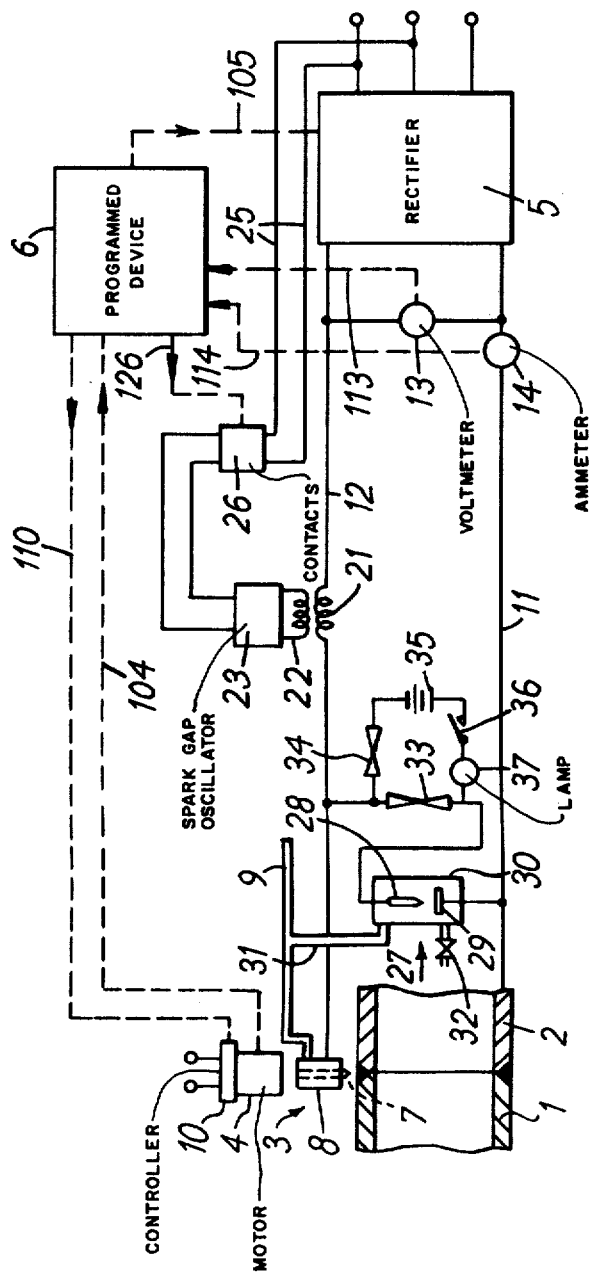

ELECTRIC ARC FUSION WELDING APPARATUS

This invention relates to electric arc fusion welding apparatus.

Many welding machines for so-called TIG (an acronym for "tungsten, inert-gas") welding are being developed, particularly for welding heat exchanger tubes to one another end to end and for welding heat exchanger tubes by their ends to tube plates at apertures therein. In many kinds of heat exchangers there may be very large numbers of welds to be made under conditions of restricted access to each welding position and with the necessity to keep during the welding certain variables within limits which may be particularly close for welding tubes of small diameter. To meet such requirements machines of compact design and automated to work with a pre-programmed sequence of welding operations are being made. Of a sequence of operations to be performed by automatic welding apparatus after the machine has been appropriately positioned in relation to the parts to be welded, one is that of initiating the arc and for this it is common to apply across the arc gap between the electrode and the work piece high frequency voltage oscillations capable of breaking down and initially ionizing the gap to make possible the start of the d.c. arc of lower voltage required for the making of the weld as the electrode, carried by a welding head, is caused to orbit the tube or tubes by a motor controlled by a programmed device for the welding. It has been proposed to use a voltage pulse derived from a capacitor discharge to initiate the arc instead of high frequency oscillations.

The power source for automated TIG welding of tubes end to end or tubes to tube plates may be rectifier controlled by the programmed device to yield so far as possible a programmed steady current or it may be a power source yielding a pulsed direct current program according to the dictates of a programmer. Either apparatus may be arranged for high frequency starting of the d.c. arc and high frequency arc starting may also be employed for other electric arc fusion welding apparatus. The present invention applies to electric arc fusion welding apparatus generally, for tube welding or other purposes, with program-controlled motors and using arc starting by high frequency or other transitory voltage.

The present invention comprises an electric arc fusion welding apparatus with a motor for effecting relative traversing movement between a welding electrode and the work piece, means for controlling the motor according to the dictates of a program, a power source for supplying the arc and means for applying between the electrode and the work piece a transitory voltage for initiating the arc, wherein there is provided in parallel with the arc gap a secondary arc gap adapted to discharge under the transitory voltage in the absence of favourable main arc initiating conditions.

The invention will now be described by way of example with reference to the accompanying schematic drawing which shows more important elements of a TIG welding machine for welding tubes together end to end.

With reference to the drawing, an automated TIG welding machine for welding two tubes 1 and 2 together end to end comprises a welding head 3 arranged for orbiting the junction between the tubes under the drive of an electric motor 4, a rectifier 5 for supplying the welding arc with direct current and a programmed device 6 arranged to oversee and control the welding according to a pre-determined sequence of welding operations.

The welding head 3 comprises a non-consumable electrode 7 of for example thoriated tungsten on the axis of, and with its tip projecting beyond, a ceramic sleeve 8 to the interior of which inert gas for example argon is supplied for the welding operations through a gas conduit 9 and from the interior of which the inert gas supplied is discharged around the electrode tip to bathe the welding arc between the electrode tip and the tube junction. The welding head is oriented during the orbiting motion so that the electrode axis always intersects at right angles the common axis of the tubes 1 and 2. The motor 4 for driving the welding head 3 around its orbit is regulated by a motor controller 10 capable of starting and stopping the motor and adjusting its speed. The motor controller 10 is shown adjacent the motor 4 but may well in practice be located within the programmed device.

The welding current circuit includes a lead 11 connected between the metal of the tubes 1 and 2 and the rectifier 5 and a lead 12, which will usually in this type of welding be arranged to be negative with respect to the lead 11, connected between electrode 7 and the rectifier 5. A d.c. voltmeter 13 and an ammeter 14, which may both well in practice be located within the programmed device, measure the welding voltage and current respectively. In the lead 12 a coil 21 is provided which is inductively coupled to a coil 22 of a spark gap oscillator 23 which is capable of delivering periodic bursts of high frequency oscillation when connected to a.c. mains by leads 25 in which contacts 26 are interposed.

A secondary arc gap device 27 is provided comprising a cathode 28, for which a tungsten welding electrode may be used, and an anode 29 which may be in the form of a solid copper plate both arranged within a chamber which has a length of refractory glass tube 30 as a wall and of which the interior is arranged to be traversed by a stream of inert gas withdrawn from the gas conduit 9 in a conduit 31 under control of a valve 32 in a gas discharge conduit from the chamber. In a modification, the inert gas stream arranged to flow through the chamber is the inert gas stream on its way to the welding head 3. The cathode 28 is electrically connected through a fuse 33 and the anode 29 is connected to the negative one of the leads 11, 12 and the anode 29 is connected to the other of the leads. The integrity of said fuse is testable by a circuit connected across the fuse and containing in series a further fuse 34, a battery 35, a normally open contact 36 and a lamp 37.

The programmed device 6 is supplied from the motor 4 with information on the welding head position through a signal line 104 and with information on the welding voltage and current through respective signal lines 113 and 114. It is adapted to control the motor controller 10 through a control line 110 and to control the rectifier output through a control line 105. In response to the signals in the lines 104, 113 and 114 the programmer adjusts the motor speed and/or the welding voltage and/or the welding current in a predetermined manner to suit the different welding conditions and requirements at different angular positions of the welding head around its orbit during the main part of the welding operations. Moreover, the programmed device may be arranged to ensure a slow speed for a period earmarked for arc initiation and initial tube junction heating before the commencement of the main part of the welding operations and will generally be arranged to ensure a slow motor speed and low arc currents subsequently to the main part of the welding operation in order to leave smaller the residual arc crater in the weld and will be arranged finally to stop the motor and extinguish the arc.

The programmed device 6, which is capable of controlling the contacts 26 through a control line 126, is arranged to maintain the contacts 26 in the leads 25 normally open but, upon the pressing of a start button (not shown) for the commencement of a welding operations, to close the contacts 26 but only until the rectifier output voltage falls below a predetermined value owing to the establishment of the required welding arc or until a predetermined short time has elapsed, which ever takes place sooner.

Before the commencement of a welding operation the contact 36 should be closed momentarily to confirm by the illumination of the lamp 37 that the circuit through the fuse 33 is intact. During the preparation of the machine for a welding operation the valve 32 should be opened to flood the chamber of the secondary arc device 27 with inert gas and to maintain thereafter a flow of inert gas therethrough; the inert gas continuously discharged therefrom should of course be recovered.

After the pressing of the said start button for the commencement of a welding operation the programmed device 6 ensures the application by the rectifier 5 of a d.c. voltage across the arc gap between the electrode 7 of the welding head 3 and the junction between the tubes 1 and 2 to be welded together end to end and, as a result of its closing of the contact 26, the superimposition upon said d.c. voltage of a high frequency high amplitude voltage capable of ensuring under proper conditions that the said arc gap breaks down and initially ionizes to allow the establishment of the d.c. arc required for the welding operation. When the d.c. arc is established the information of a fall in rectifier output voltage from the open-circuit voltage to a working voltage will be fed from a relay, not shown, sensitive to voltage fall, to the programmed device 6 to cause immediate opening thereby of the contacts 26 and thereby cessation of the high frequency voltage application to the d.c. welding circuit. The secondary arc gap in the device 27 is set at, say 25% greater than the main arc gap (properly set) in order to ensure that it does not break down under the high frequency voltage if the main arc strikes.

If, for any of a number of reasons, amongst which may be mentioned an incorrect setting of the main arc gap, a defective connection by the lead 11 between the tubes and the rectifier or a defect in the welding head allowing air entrainment by the inert gas to the arc gap, the main arc does not strike upon the application of the high frequency voltage, the high frequency voltage discharges across the secondary arc gap in the device 27. If the gas ionization by the secondary arc gap discharges makes possible a d.c. arc current in the device 27 which persists after the programmed device 6 has reopened the contacts 26 to cause cessation of the high frequency voltage application, such current is prevented from overheating and damaging the device 27 by reason of the prior blowing of the fuse 33.

If a secondary arc so strikes under the high frequency oscillations in default of a main arc strike, the return path for the high frequency oscillations provided thereby attenuates them and reduces the risk of damage to the installation. In the absence of such return path the high frequency voltage might jeopardize the installation by, for instance, "tracking" across insulation between the electrode 7 and the motor 4 and the motor controller 10 and taking a return path via the signal line 104 and/or the control line 110 and through the programmed device 6 and the rectifier 5. It will be understood that such stray high frequency currents can do damage not only by themselves to for instance complicated and sensitive apparatus using printed circuits and transistors in the programmer and rectifier but also by opening up paths of low resistance for d.c. current from the rectifier. Damage so caused may be extremely time-consuming to repair, more particularly since, as well as components burn-outs, it may involve hit-or-miss faults. The welding head is also preserved by the secondary arc gap from damage that might ensue if the high frequency oscillations were not able to discharge across the main arc gap.

It is envisaged that the step of testing the fuse 33 might be arranged to take place automatically after the pressing of the start button and so as to prevent any further operation unless the fuse was intact.

The embodiments of the invention in which an exclusive property or privilege is claimed are defined as follows:

1. A fusion arc welding apparatus for making welds on a work piece and comprising a welding head, a non-consumable electrode mounted in said head, a motor for moving said electrode along a path traversing the work piece, a device programmed for a predetermined sequence of welding operations, a controller responsive to the programmed device to regulate the operation of said motor, a direct current arc supply circuit including a rectifier and separate leads connecting the rectifier to said electrode and work piece for maintaining a working arc potential across a gap between said electrode and work piece, a circuit communicating with said electrode related lead for applying a transitory voltage therethrough to initiate the arc, said last named circuit including an alternating current supply means, a spark gap oscillator, and contact means interposed between said oscillator and supply means, said contact means being triggerable by the programmed device to supply alternating current to the oscillator for generating said transitory voltage, and means for discharging the transitory voltage should the arc fail to be initiated, said last named means including an anode connected to the work piece related lead, and a cathode connected to the electrode related lead, said anode and cathode being spaced from one another to form a secondary arc gap therebetween, and conduit means for supplying an inert gas to said first and second named arc gaps.

2. The fusion arc welding apparatus according to claim 1 wherein said cathode is a tungsten electrode.

3. The fusion arc welding apparatus according to claim 1 wherein said anode is a solid copper plate.

4. The fusion arc welding apparatus according to claim 1 including a glass tube disposed in spaced surrounding relation to the cathode and anode and communicating with said conduit means to receive inert gas therefrom.

5. The fusion arc welding apparatus according to claim 1 including a ceramic sleeve disposed in spaced surrounding relation to the electrode and communicating with said conduit means to receive inert gas therefrom.

6. The fusion arc welding apparatus according to claim 1 including a fuse interposed between the electrode related lead and said cathode.

7. The fusion arc welding apparatus according to claim 6 comprising a circuit connected across said fuse and including a battery, a normally open contact and a lamp serially disposed and operable to test the fuse when said contact is closed.

8. The fusion arc welding apparatus according to claim 7 including a secondary fuse disposed in said fuse testing circuit.

* * * * *